Aug. 11, 1931.     R. WIRTH ET AL     1,818,111
MANUFACTURE OF WIRE CHAIN
Filed Dec. 23, 1925     5 Sheets-Sheet 1

INVENTORS
RICHARD WIRTH
WILHELM BITTROLF
BY
ATTORNEYS

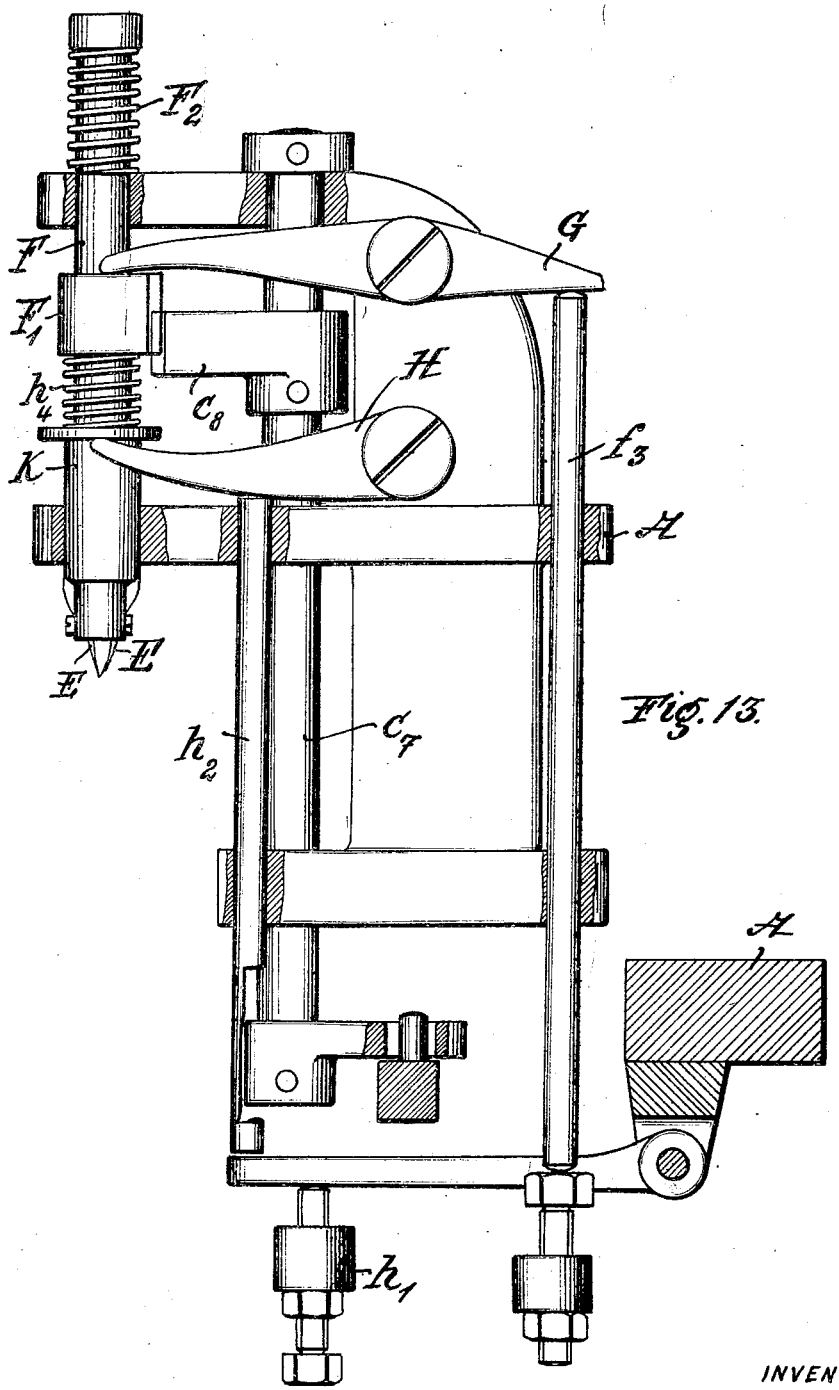

Aug. 11, 1931.  R. WIRTH ET AL  1,818,111
MANUFACTURE OF WIRE CHAIN
Filed Dec. 23, 1925  5 Sheets-Sheet 5
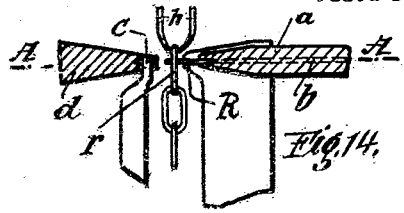
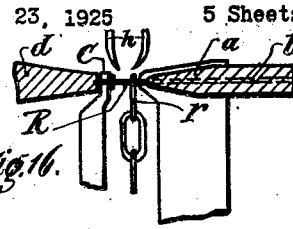
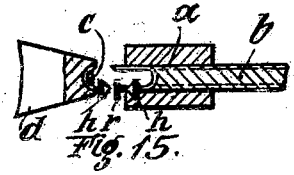
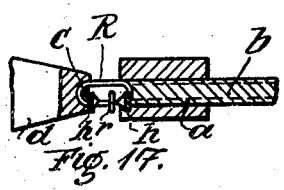
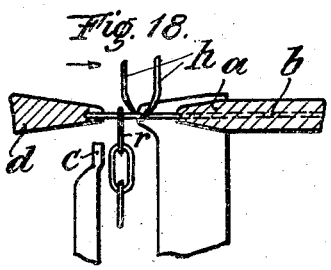
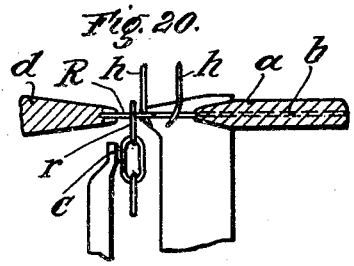
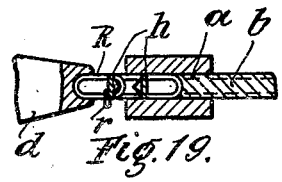
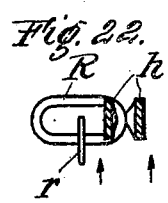
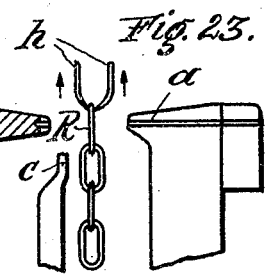
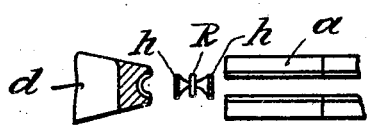
INVENTORS
RICHARD WIRTH
WILHELM BITTROLF
BY
ATTORNEYS Patented Aug. 11, 1931

1,818,111

UNITED STATES PATENT OFFICE

RICHARD WIRTH, OF FRANKFORT-ON-THE-MAIN, AND WILHELM BITTROLF, OF PFORZHEIM, GERMANY, ASSIGNORS TO ERNST GIDEON BEK, OF PFORZHEIM, GERMANY

MANUFACTURE OF WIRE CHAIN

Application filed December 23, 1925, Serial No. 77,169, and in Germany December 27, 1924.

Up till the present all chains for use in the jewelry trade were made in the following manner. A straight piece of wire is introduced through the ring previously formed and held by the shaping jaws and cut off to the required length, then the shaping jaws are opened, turned 90 degrees and moved downward for about half the diameter of the ring while the chain is suspended on the piece of cut off wire. Then a mandrel presses the piece of wire into the recesses of the pair of shaping jaws and by closing these and by the descent of a die afterwards a new link is formed. Then the mandrel is drawn out of the new link sideways and the new link is put in the position to introduce new wire, viz. by moving the said jaws upwards and turning the same backwards for 90 degrees. This machine has a limited speed on account of its massive jaws and especially on account of the size of movements to and fro which the complete tool set holder carrying said jaws has to make. This speed is generally not over 110 to 120 rings per minute. On account of these movements of the tools it was not possible heretofore to manufacture simultaneously on one machine several rows of chains nor to work the tools by one driving gear. The purpose of this invention is to raise the speed of the individual sets of tools to double or even a higher speed and to place a row of such sets of tools side by side in order to produce rows of chains by one driving gear.

The object of our invention consists in avoiding these two movements of the pair of jaws and their carrier or at least the turning movement. This is achieved by letting the newly formed ring fall out of the pair of pliers and by giving it a turning and an upward movement, a kind of a screw like movement by other means allowing of a quicker movement. By this movement the ring is placed out of the position in which it has been formed into the position in which a new piece of wire can be introduced in it. Such a means may be a pair of specially shaped pincers, or a gripping device or a hook or a pair of hooks. These organs can be shaped so lightly that the shocks occuring at the point of change of direction of the movements do not occur at all or at least much more lessened even when the machine works very rapidly. Outside of the raising of the speed a further saving of time is made because during this motion of the ring the mentioned pair of ring forming jaws can already return in position to form a new ring. It is also possible to use other tools than the said jaws for forming the ring. Furthermore, so called Figaro chains can be made after this system viz. chains with links of different sizes and of different colors out of different wires. The Figures 1 to 8 show the general working method of this new mechanism for forming so called trace chains.

Fig. 13 shows an enlarged view, partly in sections, of the gripping device and its working mechanism.

Figs. 14–24 show another method of making the ring. Instead of the shaping jaws the wire is first bent in U shape and then closed by a back forming tool.

Figure 11:
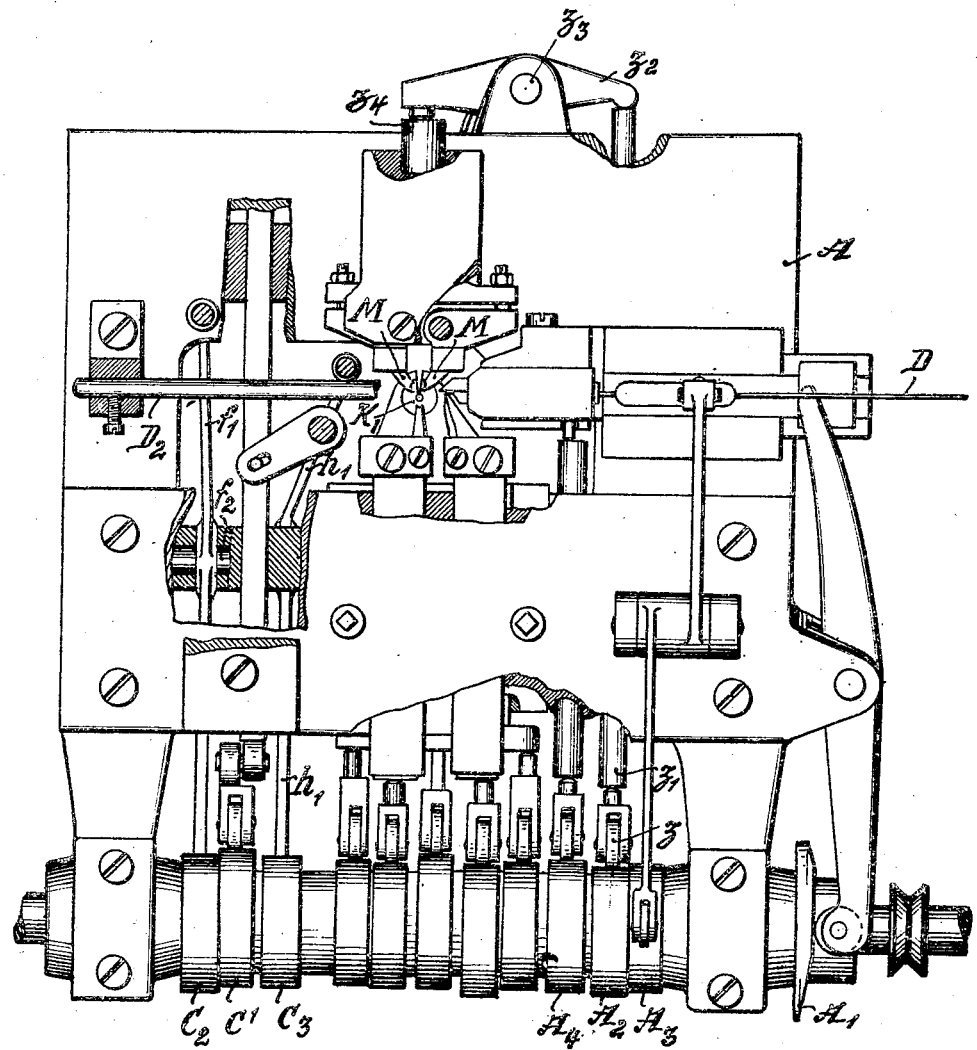
Fig. 11 shows a horizontal view of the machine in which the working mechanism is visible, partly in section.
Figure 12:
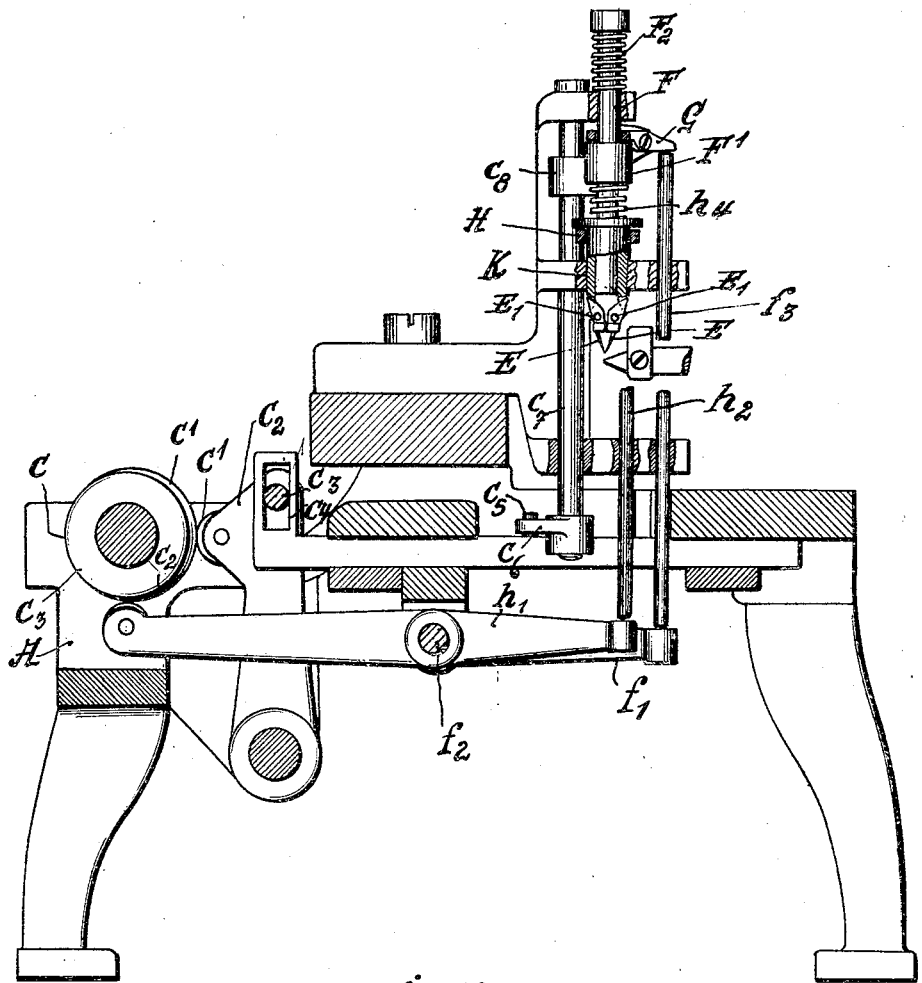
Fig. 12 shows a side view of the same machine, partly in sections and leaving off unimportant parts.

In Figs. 11–13 A is the machine frame, on which the driving shaft is mounted with a number of cams of which A 1, A 3 and A 4 perform in the usual way the feeding and the cutting of the wire D which abuts with its front end against the (broken off) front of the pin D 2. The cut off piece of wire is in this position above the mouth of the pliers or jaws M M and is pressed into the mouth of the pliers by a mandrel $K_1$ as is known in the trade. Then the pliers are closed by the cam A 2 through the means $z\ z^1\ z^2\ z^3\ z^4$. Then a pressure is brought against the nearly closed U shape by a back former which is not shown on the drawings. This pressure closes the ring completely and forms it closely around the mandrel K. All of these devices are known in the trade.

Figs. 12 and 13 show the gripping device E and its working mechanism which imparts to it the movements illustrated in Figs. 1 to 8.

The gripping device E E which is shaped similarly to a pair of pincers is placed at the lower end of a rod F and its gripping jaws may oscillate on the pivots $E^1$ $E^1$. This gripping device is rotated or oscillated by the cam $C^1$ which imparts to the means $c^1$ $c^2$ $c^3$ $c^4$ $c^5$ $c^6$ and the shaft $c^7$ an oscillating motion. This shaft $c^7$ has a toothed sector $c^8$ attached to it which meshes with the toothed sector $F^1$ of shaft F.

The up and downward motion of the shaft F is brought about in the following manner:

A spring F 2 pushes the shaft F upwards; the downward motion is caused by a forked lever G which rests on top of the toothed sector $F^1$. The lever G is moved upward at its near end by the cam $C^2$ and the means $f^1$ $f^2$ $f^3$. The downward motion being caused by spring $F^2$.

The combination of the two motions of the shaft F gives it a movement up and down and also causes it to rotate.

For opening and for closing of the gripping device E E the following mechanism is applied. The cam $C^3$ moves the lever H upwards by the means $h^1$ $f^2$ $h^2$. This lever is pushed down by the spring $h^4$ and acts on the sleeve K which is axially movable and slides on the shaft F. By this downward movement the sleeve K strikes against the back ends of the two shanks of the gripping device E E and closes them in a known manner while the opening motion of the gripping device is caused by a spring, not shown in the drawing, in the usual way while the lever H turns upwards.

Figs. 1–8 show schematically the cooperation of the pincers E E with the devices for forming the ring out of a length of wire. M M are the jaws, which bend the wire to a ring. P is the former closing the ring joint and shaping the ring adjacent to the joint. Q is the mandrel bending the length of wire between the open jaws M M.

Figure 1:
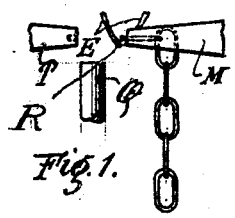
Figure 2:
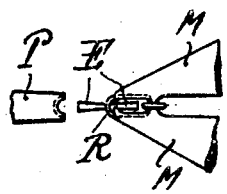

In Figs. 1 and 2 the ring R is completed, held between the jaws M M, and the mandrel Q withdrawn from the inside of the ring. The pincers E E in the lowest position have gripped the ring R.

Figures 3, 5, 7:
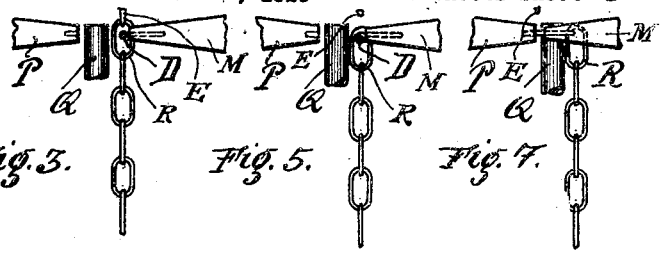
Figures 4, 6, 8:
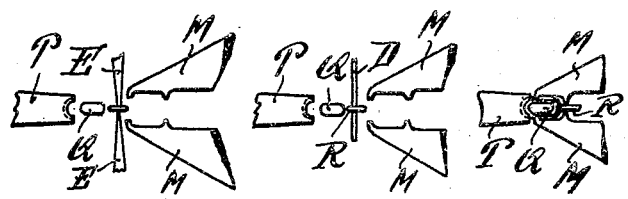

Figs. 3 and 4 show the jaws M M opened and the ring R lifted to the upper position of the pincer E E and turned at the same time 90 degrees. In this position a new length of wire D is inserted into the ring R. Hereupon the pincers are opened and drop the ring R and the chain, whereof it is the uppermost link. Figs. 5 and 6.

The ring R is supported now by the new length of wire D. Now the former P moves to the right hand and bends the wire D between the opened jaws M M in the usual manner and the jaws close. Figs. 7 and 8.

Yet it is to be remarked that the jaws M M are horizontal and not vertical as usual.

A further advantage of the new machine is evident herefrom. If by some cause there is a failure by which one ring is not formed, the machine works on making a new length of chain, the old length of chain dropping below.

In the usual machine at such an emergency the machine had to be stopped, because the rings made after the missing of one ring were not interlinked.

Figure 9:
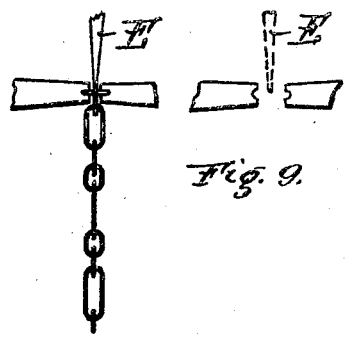
Figs. 9 and 10 show the method of making Figaro chains.
Figure 10:
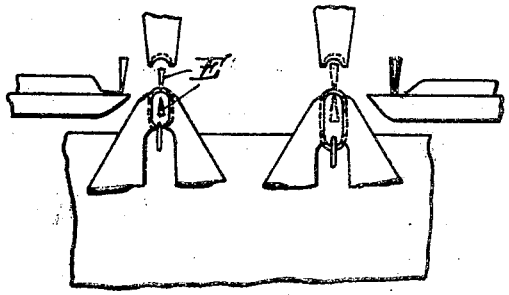

The machine shown schematically in Figs. 9 and 10 differs from the machine described only in that two mechanisms for the formation of two rings of different sizes, or of different colors from two different wires are contained therein one beside the other and in that the mechanism which carries and moves the pincers E E has besides the three motions herebefore described a further or fourth motion by which it transports the gripped ring during or after it has been raised to and fro from one ring forming mechanism to the other ring forming mechanism after forming the second ring or several rings of the same size the mechanism perfecting this motion not being shown.

Figs. 14–24 show the mode of operation of another embodiment of the invention.

The starting point of this variation is the ring mesh machine on which a link is formed in a U shape in horizontal position on one side of the mesh, then one of the two open ends of this U shaped link is pushed through the adjacent ring of the last made row of rings and on the back sides of the mesh the ring is closed by a back former with the aid of a center former or mandrel.

The fundamental thought of the invention is to grip the last formed link of the chain with a special tool and to give it such a motion after it has been cleared from the link shaping tools, that it is ready in position for the introduction of one end of the wire in the operation of shaping the link. In this variation it is not the end of wire before the bending of the wire, but an end of the U shaped wire after the first bending operation. This positioning motion of the link was lifting and turning in the previous example and is lifting and horizontal transport for about half of the horizontal diameter of the ring in the present variation.

Figs. 14–24 also illustrate in longitudinal and transverse sections the cooperation of pincers as described with ring forming devices as described in the Smith U. S. A. Patent 1,078,317.

The U shaped link is formed in the grooved guide $a$, then it is pushed forward by the front former $b$ into the last ring and then the back former $d$ closes it around mandrel $c$ as is known.

Figs. 14 and 15 show that the ring $r$ is suspended between the two points of the pincers $hh$. During the closing of the U shaped link by motion of back former $d$ the pincers $hh$ open and go upwards in the position illustrated in Figs. 14 and 15 and drop the ring $r$, after the new ring R has been formed out of the U shaped link and while it is still held between the front and back forming tools.

Figs. 16 and 17 show the then following sidewise and lowering motion of the open pincers $hh$ so that both shanks of the pincers are at the right side of ring $r$.

Figs. 18 and 19 illustrate the further lowering motion of the pincers, by which one of the shanks $h$ enters into the ring R. Afterwards the pincers close and adopt the position shown in Fig. 5 on a larger scale. During or immediately after the closing of the pincers $hh$, the ring R is let loose by the back former and mandrel C the latter withdrawing downward immediately after the closing of ring R as already shown in Fig. 18, the back former alone molding the ring R sufficiently firm.

Figs. 23 and 24 show the pincers $hh$ after they have been raised and shifted into their new place. The weight of the suspended chain together with the raising of the pincers make the ring R fall in the vertical position. It is evident herefrom that the pincers themselves have no turning or oscillating motion, but the turning by 90 degrees is done by the ring formed before the last formed ring $r$ when falling into the lower half of the last formed ring R.

The motions of the grippers are simple opening and closing vertical and sidewise motions, which may be carried out by many mechanisms known in the trade.

Now what we claim is the following:

1. In a machine for making wire chain, in combination, link forming implements, means to feed link blanks toward said implements, a tool for grasping, raising and turning the last made link to position it across the path through which the link blanks are projected, said tool comprising a pincers-like arrangement of fingers, the fingers moving toward each other entering the link aperture and supporting the topmost link at the top and by the inner surface thereof, and while supporting said link, raising the link and turning it at an angle of substantially 90 degrees so that the link is positioned across the path through which the link blanks are projected said tool moving perpendicular to the plane in which the link is formed.

2. In a machine for making wire chain, in combination, a plurality of sets of link forming implements, means to feed link blanks toward said implements, a tool for grasping, raising, and turning the last made link to position it across the path through which the link blanks are projected, said tool entering the aperture of the last formed link and supporting it from the inner surface of the top side thereof said tool moving perpendicular to the plane in which the links are formed.

3. In a machine for making wire chain, in combination, a set of tools adapted to cut link blanks to predetermined lengths and to interengage each blank with a previously formed link, and an implement adapted to enter the aperture of the links, as the links are successively formed and to turn the last formed link to position it across the path through which the foremost end of each link blank moves so that the said end of each blank is projected through the link held by said implement, said implement moving perpendicular to the plane in which the links are formed.

4. In a machine for making wire chain, in combination, implements to form successive link blanks to link formation, means to feed the blanks, successively toward the implements and a tool adapted to enter the aperture of the links as the links are successively formed and to lift and position the last made link across the path through which the link blanks are projected, said tool retaining the successive links in the path through which the blanks are projected while the end of the blank is interengaged with the held link, said holding tool moving perpendicular to the plane in which the links are formed.

5. In a machine for making wire chain, in combination, link forming implements, means to feed link blanks toward said implements, a tool for grasping, raising, and turning the last made link to position it across the path through which the link blanks are projected, said tool moving toward each link and entering the aperture thereof while it still lies in the path through which the forming implements move and supporting the last formed link at the inner surface of the top side thereof and while supporting said link, raising the link and changing its position so that the grasped link shall lie across the path through which the link blanks are projected, said tool holding the chain in a freely suspended position while a blank is projected through the terminal link, said holding tool moving perpendicular to the plane in which the links are formed.

In testimony that we claim the foregoing as our invention, we have signed our names this 11th day of December, 1925.

RICHARD WIRTH.
WILHELM BITTROLF.